United States Patent [19]

Sato et al.

[11] Patent Number: 4,975,485

[45] Date of Patent: Dec. 4, 1990

[54] ETHYLENE POLYMER AND PROCESS FOR PREPARING SAME

[75] Inventors: Morihiko Sato; Kaname Ohashi; Keiji Sugihara, all of Yotsukaichi, Japan

[73] Assignee: Tosoh Corporation, Yamaguchi, Japan

[21] Appl. No.: 299,240

[22] Filed: Jan. 19, 1989

[30] Foreign Application Priority Data

Jun. 23, 1988 [JP] Japan ................... 63-153601

[51] Int. Cl.$^5$ ............................................. C08L 23/04
[52] U.S. Cl. ..................................... 525/53; 525/240; 525/324
[58] Field of Search ........................................... 525/53

[56] References Cited

U.S. PATENT DOCUMENTS 4,336,352 6/1982 Sakurai et al. ................... 525/53
4,550,143 10/1985 Tanaka et al. ................... 525/240

FOREIGN PATENT DOCUMENTS 57-141409 9/1982 Japan.
58-138719 8/1983 Japan.
59-10724 3/1984 Japan.
59-227913 12/1984 Japan.
61-207404 9/1986 Japan.
62-25105 2/1987 Japan.
62-25106 2/1987 Japan.
62-25107 2/1987 Japan.
62-25108 2/1987 Japan.
62-25109 2/1987 Japan.

*Primary Examiner*—John C. Bleutge
*Assistant Examiner*—Vasu S. Jagannathan
*Attorney, Agent, or Firm*—Cushman, Darby & Cushman

[57] ABSTRACT

Ethylene is polymerized, optionally with a small amount of an α-olefin, in the presence of a Ziegler catalyst in multiple stages by using a polymerization apparatus including at least three polymerization reactors. In the polymerization process, the following three ethylene polymer components U, H and L are prepared sequentially in an optional order; a component U having an α-olefin content $a_U$ of 0.1–10 wt. % and an intrinsic viscosity $[\eta]_U$ satisfying $2 \times [\eta]_W \leq [\eta]_U \leq 5 \times [\eta]_W$ in which $[\eta]_W$ is the intrinsic viscosity of the entire ethylene polymer, the ratio $R_U$ of component U in the entire ethylene polymer satisfying $0.3 \times [\eta]_W \leq [\eta]_U \times R_U \leq 0.8 \times [\eta]_W$; a component H having an α-olefin content $a_H$ of up to 20 wt. % and an intrinsic viscosity $[\eta]_H$ satisfying $([\eta]_W)^{\frac{1}{2}} \leq [\eta]_H \leq 1.5 \times [\eta]_W$, the ratio $R_H$ of the component H satisfying $0.25 \times [\eta]_W \leq [\eta]_H \times R_H \leq 0.7 \times [\eta]_W$; and an ethylene polymer component L having an α-olefin content $a_L$ of up to 10 wt. % and an intrinsic viscosity $[\eta]_L$ satisfying $0.2 \leq [\eta]_L \leq 2.0$, the ratio $R_L$ of the component L satisfying $[\eta]_L \times R_L \leq 0.05 \times [\eta]_W$. The ethylene polymer satisfies the requirement of $a_U \times R_U \leq 0.2 \times (a_U \times R_U + a_H \times R_H + a_L \times R_L)$, and has $[\eta]_W$ of 1.5 to 4.0. The catalyst used is such that, when the component H is prepared independently, the molecular weight distribution Mw/Mn of the obtained ethylene polymer is in the range of from 7 to 17 and the rate constant of deactivation Kd at said polymerization is larger than 0.3 hr$^{-1}$.

10 Claims, 1 Drawing Sheet

ETHYLENE POLYMER AND PROCESS FOR PREPARING SAME

BACKGROUND OF THE INVENTION

(1) Field of the Invention

The present invention relates to preparation of an ethylene polymer having a broad molecular weight distribution. More particularly, it relates to an ethylene polymer which has excellent melt properties and processability and is suitable for blow molding and extrusion molding, and to a process for the preparation thereof.

(2) Description of the Related Art

Polyethylene having a relatively high molecular weight and a broad molecular weight distribution is required in the fields of blow molding and extrusion molding. Attempts have been made to prepare a polymer having a broad molecular weight distribution in a single polymerization step while selecting an appropriate catalyst. However, in the case of a catalyst capable of giving polyethylene having a broad molecular weight distribution, it is generally difficult to obtain a sufficiently high productivity, and since the molecular weight distribution is regulated by the properties of the catalyst, polyethylene having a molecular weight distribution suitable for the intended use is not advantageously obtained. Accordingly, a process in which polyethylene having a high molecular weight and polyethylene having a low molecular weight are prepared in succession through at least two stages of polymerization has been considered as the process for overcoming this disadvantage and has been proposed as the multi-stage polymerization process. According to this process, polyethylene having a broad molecular weight distribution and hence, showing a good flowability even through the molecular weight is relatively high can be obtained at a high productivity. To adjust the rigidity of polyethylene, an α-olefin is copolymerized as the comonomer, and it is known that if the α-olefin is incorporated so that the α-olefin content in a polymer having a high molecular weight is higher than in a polymer having a low molecular weight, the balance between the rigidity and the environmental stress cracking resistance (ESCR) is highly improved However, ethylene polymers prepared by the multi-stage polymerization process have several problems in processing and molding though it has excellent properties as described above. Namely, the melt tension of the polymer is low and the die swell is small. In the case of blow molding, not only the molecular weight and molecular weight distribution but also the melt properties of the polymer, that is, the melt tension and die swell, are important. In the blow molding process, a cylindrical molten polymer called parison is extruded from a die, and when the parison comes to have a predetermined length, a gas such as air is blown into the parison to cause the parison to adhere closely to the inner wall of the mold and obtain a molded article If the melt tension of the polymer is low, drawdown, i.e., hanging-down of the parison due to its own weight occurs, and even if molding of a large-size product is tried, breaking of the parison hanging from the die due to the weight of the parison occurs. When the molten polymer is extruded from the die of the molding machine, swelling occurs due to the Barus effect. The ratio of the diameter of the parison to the diameter of the die is called the die swell ratio and is used as the criterion for indicating the swelling degree. According to the blow molding process, a bottle or another hollow article is formed from this parison having a predetermined length, but in the case of polyethylene having a small die swell, the thickness of the product is reduced and it is difficult to obtain products having a constant weight. Therefore, exchange of dies becomes necessary for adjusting the thickness. Accordingly, spare dies are necessary for makers providing various molded products, and the productivity is reduced and the process becomes disadvantageous from the economical viewpoint. Moreover, the die swell depends on the shear rate, and thus, if the shear rate is changed, also the die swell is changed. If the dependency of the die swell on the shear rate is large, the thickness is changed by a slight change of the shear rate and it becomes difficult to obtain products having a constant weight, and in short, the molding stability is degraded and the process becomes extremely disadvantageous from the industrial viewpoint. Furthermore, where a film is prepared by inflation as the extrusion molding, if the melt tension is low, the bubble becomes unstable.

As the means for improving the die swell, one of visco-elastic properties, there has been proposed a multi-stage polymerization process including three stages of polymerization, in which a polymer having an extremely high molecular weight is prepared at one of the polymerization stages. For example, Japanese Examined Patent Publication No. 59-10724 discloses a process in which a polymer having a molecular weight higher than 1,000,000 is formed in an amount of 1 to 10% based on the entire polymer, and in examples of this patent publication, an attempt to improve the die swell by preparing a polymer having a molecular weight of 3,000,000 in an amount of 5% based on the formed polymer is shown.

Japanese Unexamined Patent Publication No. 57-141409 discloses a process in which a high-molecular-weight polymer having an intrinsic viscosity $[\eta]$ of 7 to 40 is prepared, and in examples of this patent publication, there is shown an attempt to adjust the die swell in a broad range by changing the intrinsic viscosity $[\eta]$ within the range of from 7.69 to 14.8 and controlling the amount formed of the polymer below 10.5% based on the entire polymer. However, when we made tracing experiments of these attempts, it was found that the improvement of the die swell by these attempts is still insufficient and the dependency of the die swell on the shear rate tends to increase. Moreover, polyethylene containing a small amount of a polymer having an extremely high molecular weight is insufficient in the homogeneousness because of the presence of hard spots or gels. Moreover, the foregoing proposals do not refer to the melt tension which is one of important characteristics of the melt.

Japanese Unexamined Patent Publication No. 59-227913 discloses a process in which an ultra-high-molecular-weight polymer having an intrinsic viscosity $[\eta]$ of 11 to 26 as measured at 135° C. in decalin as the solvent is formed in an amount of 5 to 23% by weight at the first stage of polymerization, and subsequently, a polymer having $[\eta]$ of 0.25 to 1.6 and a polymer having $[\eta]$ of 2.9 to 5.1 are formed in an optional order, and examples of the batchwise process are illustrated and attempts to improve the mechanical strength are shown. However, a high productivity is not attained by the batchwise process, and in the case of the continuous process in which attainment of a high productivity is possible, it is necessary to solve the problem of heterogeneousness caused by the difference of the residence time among particles, which is not observed in the batchwise process, and many other difficult problems.

Furthermore, Japanese Unexamined Patent Publication Nos. 62-25105 through 62-25109 disclose a continuous multi-stage polymerization process, but in all of examples in these patent publications, the amount formed of an ultra-high-molecular-weight component having an intrinsic viscosity [$\eta$] of at least 15 as measured at 135° C. in decalin is smaller than 5% by weight and it is taught that if the amount of this component exceeds 5% by weight, a gel or hard spot is formed.

In the foregoing conventional techniques, since the ratio of the formed ultra-high-molecular-weight component is low or the polymerization is carried out batchwise, the problem of heterogeneousness of the polymer (formation of gel or hard spots) does not arise.

Moreover, Japanese Unexamined Patent Publication No. 58-138719 discloses a process in which a high-molecular-weight ethylene (co)polymer having an intrinsic viscosity [$\eta$] of 1.5 to 11, preferably 1.5 to 7, an ethylene (co)polymer having an intrinsic viscosity [$\eta$] of 0.5 to 8 and an ethylene (co)polymer having an intrinsic viscosity [$\eta$] of 0.2 to 3 are formed by the multi-stage polymerization. In this patent publication, a high-molecular-weight component having a relatively low molecular weight corresponding to [$\eta$] of 2.60 to 6.72 is mainly examined in both of the batchwise process and the continuous process, and it is taught that since the product is an ethylene (co)polymer comprising the high-molecular-weight component, the low-molecular-weight component and the medium-molecular-weight component, the process is advantageous in that formation of hard spots is controlled. However, the melt properties necessary for formation of hollow articles are not described. As the result of investigations made by us, it was found that, in the conventional continuous multi-stage polymerization process, if [$\eta$] of the high-molecular-weight component exceeds 6, hard spots are readily formed in the product, and any means must be taken for overcoming this disadvantage.

We already proposed the process in Japanese Unexamined Patent Publication No. 61-207404, but the process is not completely satisfactory in the continuous polymerization. Moreover, since the molecular weights and formation ratios of the respective components are not determined based on the intrinsic viscosity of finally obtained polyethylene, the melt tension, die swell and drawdown resistance are not satisfactorilY improved in the obtained polyethylene and the effect of a radical generator, stated in this patent publication, is not manifested.

As is apparent from the foregoing description, development of a process comprising the step of forming ultra-high-molecular-weight polyethylene by polymerization, in which polyethylene having excellent melt tension, die swell and drawdown resistance is continuously prepared at a high productivity, the obtained polymer has an excellent homogeneousness even if the ratio of the ultra-high-molecular-weight component is high, formation of gels or hard spots is controlled and the obtained polyethylene is suitable for blow molding, is eagerly desired.

SUMMARY OF THE INVENTION

A primary object of the present invention is to provide an ethylene polymer having improved melt tension, die swell, drawdown resistance, processability and moldability.

Another object of the present invention is to provide an ethylene polymer having an enhanced adaptability to blow molding and extrusion molding.

Still another object of the present invention is to provide an ethylene polymer having an excellent homogeneity.

In one aspect of the present invention, there is provided a process for the preparation of an ethylene polymer comprising the following three ethylene polymer components U, H and L, which are prepared sequentially in an optional order;

an ethylene polymer component U having an $\alpha$-olefin content $a_U$ of 0.1 to 10% by weight and an intrinsic viscosity [$\eta$]$_U$, satisfying the requirement of $2\times[\eta]_W \leq [\eta]_U \leq 5\times[\eta]_W$ in which [$\eta$]$_W$ which stands for the intrinsic viscosity of the entire ethylene polymer, the ratio $R_U$ of the component U in the entire ethylene polymer satisfying the requirement of $0.3\times[\eta]_W \leq [\eta]_U \times R_U \leq 0.8\times[\eta]_W$;

an ethylene polymer component H having an $\alpha$-olefin content $a_H$ of up to 20% by weight and an intrinsic viscosity [$\eta$]$_H$ satisfying the requirement of $([\eta]_W)^{\frac{1}{2}} \leq [\eta]_H \leq 1.5\times[\eta]_W$, the ratio $R_H$ of the component H in the entire ethylene polymer satisfying the requirement of $0.25\times[\eta]_W \leq [\eta]_H \times R_H \leq 0.7\times[\eta]_W$; and an ethylene polymer component L having an $\alpha$-olefin content $a_L$ of up to 10% by weight and an intrinsic viscosity [$\eta$]$_L$ satisfying the requirement of $0.2 \leq [\eta]_L \leq 2.0$, the ratio $R_L$ of the component L in the entire ethylene polymer satisfying the requirement of $[\eta]_L \times R_L \geq 0.05\times[\eta]_W$;

the three components $R_U$, $R_H$ and $R_L$ in said ethylene polymer satisfying the requirement of $(R_U+R_H+R_L)=1$ and each of $R_U$, $R_H$ and $R_L$ being smaller than 1, said ethylene polymer satisfying the requirement of $a_U\times R_U \geq 0.2\times(a_U\times R_U+a_H\times R_H+a_L\times R_L)$; and the intrinsic viscosity [$\eta$]$_W$ of the entire ethylene polymer being in the range of $1.5 \leq [\eta]_W \leq 4.0$.

In another aspect of the present invention, there is provided a process for the preparation of the above-mentioned ethylene polymer, which comprises polymerizing ethylene, optionally with a small amount of an $\alpha$-olefin, in the presence of a Ziegler catalyst in multiple stages, wherein by using a polymerization apparatus including at least three polymerization reactors, the above-mentioned three ethylene polymer components U, H and L are prepared sequentially in an optional order, wherein the catalyst has a property such that when the component H is prepared independently, the molecular weight distribution Mw/Mn of the obtained ehtylene polymer is in the range of from 7 to 17 and the rate constant of deactivation Kd at said polymerization is larger than 0.3 hr$^{-1}$.

In still another aspect of the present invention, there is provided a process for the preparation of the above-mentioned ethylene polymer, which comprises polymerizing ethylene, optionally with a small amount of an $\alpha$-olefin by the same procedure as described above and then placing the thus-obtained ethylene polymer in contact with a radical generator.

DESCRIPTION OF THE PREFERRED EMBODIMENTS

Figure 1:
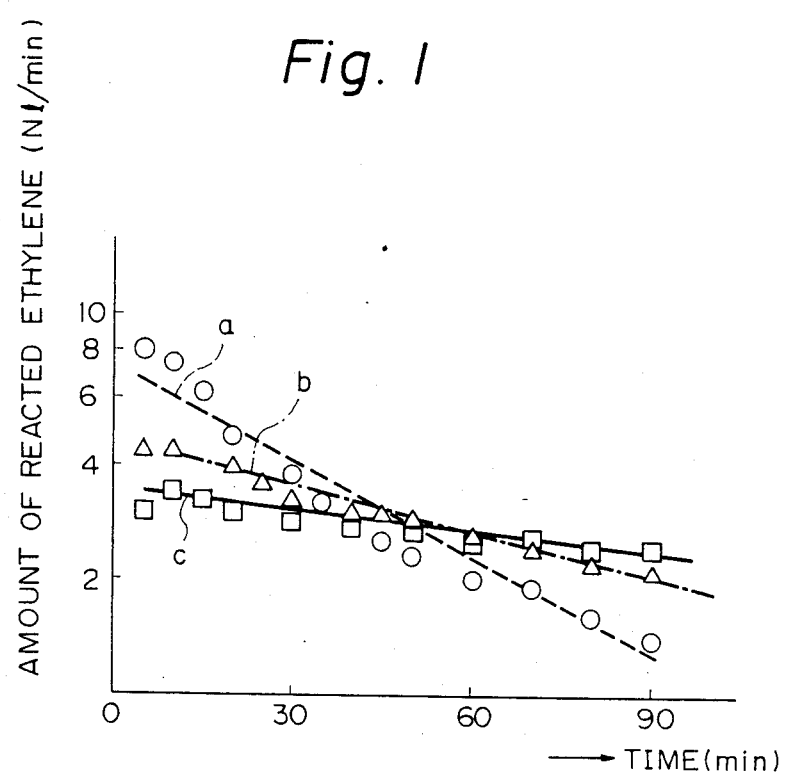
FIG. 1 shows the relationship of the conversion of ethylene with the lapse of time. Lines a, b and c correspond to the results obtained in Referential Examples 1, 2, and 3, respectively.

According to the present invention, polymerization of ethylene or copolymerization of ethylene with an α-olefin is carried out under polymerization conditions using at least three polymerizing reactors in multiple stages. The ethylene polymer obtained according to the present invention comprises an ultra-high-molecular-weight component (component U), a high-molecular-weight component (component H) and a low-molecular-weight component (component L).

As pointed out hereinbefore, it is known that the melt tension, die swell and drawdown resistance of an ethylene polymer can be highly improved by incorporation of an ultra-high-molecular-weight component. However, the polymer comprising an ultra-high-molecular-weight component has a poor compatibility because of a large difference of the molecular weight among the components, and the polymer becomes heterogeneous and has defects such as gels, hard spots and fish-eyes. In the continuous polymerization, unlike the batchwise process, heterogeneousness is easily induced by the difference of the residence time among particles. By deciding the molecular weights and production ratio of the respective components based on the molecular weight $[\eta]_W$ of finally produced ethylene polymer and selecting the kind and amount of the α-olefin according to the intended use of the product, the melt tension, die swell, drawdown resistance, processability and formability, and homogeneousness of the obtained ethylene polymer can be adjusted to optimum levels.

In the component U, the intrinsic viscosity $[\eta]_U$ is in the range of $2\times[\eta]_W \leq [\eta]_U \leq 5\times[\eta]_W$, preferably $2.5\times[\eta]_W \leq [\eta]_U \leq 4\times[\eta]_W$, and the production ratio $R_U$ is in the range of $0.3\times[\eta]_W \leq [\eta]_U \times R_U \leq 0.8\times[\eta]_W$, preferably $0.35\times[\eta]_W \leq [\eta]_U \times R_U \leq 0.7\times[\eta]_W$. If $[\eta]_U$ and $R_U$ are too small and below the above-mentioned ranges, sufficient melt tension, die swell and drawdown resistance cannot be obtained. If $[\eta]_U$ is too large and exceeds the above-mentioned range, the homogeneousness of the product is degraded and gels or hard spots are formed. If $[\eta]_U$ and $R_U$ exceed the above-mentioned ranges, the molecular weight $[\eta]_W$ of the product becomes too high and the processability and moldability is drastically degraded.

In the component H, the intrinsic viscosity $[\eta]_H$ is in the range of $([\eta]_W)^{\frac{1}{2}} \leq [\eta]_H \leq 1.5\times[\eta]_W$, preferably $([\eta]_W)^{\frac{1}{2}} \leq [\eta]_H \leq 1.3\times[\Theta]_W$, and the production ratio $R_H$ is in the range of $0.25\times[\eta]_W \leq [\eta]_H \times R_H \leq 0.7\times[\eta]_W$, preferably $0.3\times[\eta]_W \leq [\eta]_H \times R_H \leq 0.6\times[\eta]_W$. If $[\eta]_H$ and $R_H$ are too small and below the above-mentioned ranges, the effect of improving the melt tension, die swell, drawdown resistance and homogeneousness is not satisfactory. If $[\eta]_H$ and $R_H$ exceed the above-mentioned ranges, the molecular weight becomes too high or the flowability is degraded.

In the component L, the intrinsic viscosity $[\eta]_L$ is in the range of $0.2 \leq [\eta]_L \leq 2.0$ and the production ratio $R_L$ is in the range of $[\eta]_L \times R_L \geq 0.05\times[\eta]_W$. In the case of $[\eta]_L < 0.2$, the molecular weight is too low and the amount of the polymer soluble in a solvent drastically increases, and the melt tension and drawdown resistance are degraded. In the case of $[\eta] > 2.0$, the molecular weight distribution is narrow and the flowability is degraded.

The intrinsic viscosities $[\eta]$ and polymerization ratios of the respective components can be optionally adjusted within the above-mentioned ranges, but they are preferably controlled so that the intrinsic viscosity of the final product is 1.5 to 4.

If copolymerization of ethylene with α-olefin is carried out in the process of the present invention, the α-olefin used is preferably selected from propylene, butene-1, hexene-1, octene-1 and 4-methylpentene-1. These α-olefins can be used singly or in the form of a mixture of two or more thereof. Preferably, the α-olefin is contained in a larger amount in a higher-molecular-weight component. If the amount of α-olefin is thus controlled, the balance between the rigidity and ESCR is highly improved in the obtained ethylene copolymer. The α-olefin contents $a_U$, $a_H$ and $a_L$ in the respective components U, H and L are determined so that the requirement of $a_U \times R_U \geq 0.2 \times (a_U \times R_U + a_H \times R_H + a_L \times R_L)$, preferably $a_U \times R_U \geq 0.3 \times (a_U \times R_U + a_H \times R_H + a_L \times R_L)$, is satisfied. If $a_U$ satisfies this requirement, the homogeneousness is highly improved even in polyethylene prepared by the continuous multi-stage polymerization. The reason is considered to be that since the ultra-high-molecular-weight ethylene polymer becomes a copolymer, the melting point is lowered and the meltability is increased, and hence, the compatibility with the other components is increased. By the increase of the homogeneousness, also the melt tension is increased. If the intrinsic viscosities, production ratios and α-olefin contents of the respective components are adjusted within the above-mentioned ranges, the intended effects of the present invention can be attained.

The above-mentioned three components are produced in an optional order in at leas three sequential polymerization stages. There can also be, adopted a method in which the components U and L produced in parallel and are concurrently by polymerization, the polymers of both components are mixed and then, formation of the component H is carried out by polymerization. At the polymerization step, the intrinsic viscosity $[\eta]$ of the polymer is generally adjusted by a molecular weight-adjusting agent such as hydrogen. Where the molecular weight is adjusted based on the hydrogen concentration, if the hydrogen concentration at the early stage is higher than the hydrogen concentration at the later stage, a hydrogen-purging step must be placed between the two stages. When a polymer having a higher intrinsic viscosity $[\eta]$ is prepared, the polymerization can be prepared in the absence of the molecular weight-adjusting agent. In this case, the molecular weight can be adjusted by changing the polymerization temperature.

A polymer containing an ultra-high-molecular-weight component has a poor compatibility and becomes heterogeneous because the difference of the molecular weight thereof from the molecular weights of the other components is large, and formation of gels, hard spots and fish eyes is often caused. In the present invention, the molecular weights and production ratios of the respective components are determined in the above-mentioned manner for mitigating this problem.

Preferably, the catalyst used in the present invention has a high activity, gives a polymer having a specific molecular weight distribution and has a relatively large rate constant of deactivation (Kd).

Namely, if the activity of the catalyst is too low in the present invention, the productivity is reduced. More specifically, the catalyst used in the present invention is required to give a polymer having a relatively broad molecular weight distribution, and preferably the catalyst has a property such that when an ethylene polymer corresponding to the component H is prepared alone, the molecular weight distribution Mw/Mn of the obtained ethylene polymer is in the range of from 7 to 17. In the case of a catalyst giving a relatively narrow molecular weight distribution Mw/Mn smaller than 7, the improvement of the homogeneousness, melt tension and die swell, as one of the prominent effects of the present invention, is not satisfactory. If a catalyst giving Mw/Mn exceeding 17 is used, a large quantity of the molecular weight-adjusting agent, for example, hydrogen, must be used at the polymerization for the preparation of the component L, with the result that the catalyst activity is drastically reduced and the productivity is degraded.

Preferably the rate constant of deactivation Kd of the catalyst is larger than 0.3 hr$^{-1}$, especially larger than 0.4 hr$^{-1}$. If Kd is small, the homogeneousness is unsatisfactory. The reason is not clear, but it is believed that the reason is as follows. For example, in the case of a catalyst having a Kd value not larger than 0.3 hr$^{-1}$, it is considered that there are present active sites appearing at the start of the polymerization and active sites appearing during the advance of the polymerization. If active sites thus appear at the later stage, the Kd value becomes small, and since these active sites differ from the active sites formed at the start of the polymerization in the polymerization time, this difference can be considered as one cause of induction of the heterogeneousness. The catalyst used in the present invention is not practically limited so far as the above-mentioned requirements are satisfied. However, a Ziegler type catalyst described below can be used.

For example, there can be mentioned a catalyst comprising (A) a solid catalyst obtained by reacting (I) a reaction product between a transition metal-containing reactant containing at least one titanium compound and at least one member selected from the group consisting of (a) combinations of metallic magnesium with hydroxyl group-containing organic compounds, and (b) oxygen-containing organic compounds of magnesium, (II) at least one organic aluminum compound represented by the general formula in which AlR$_n$X$_{3-n}$ in which R stands for an alkyl group having 1 to 20 carbon atoms, X stands for a halogen atom and n is a number of $0 \leq n \leq 3$ and (III) at least one silicon compound, and (B) an organic metal catalyst containing a metal of the group Ia, IIa, IIb, IIIb or IVb of the Periodic Table.

As the transition metal-containing reactant containing a titanium compound, there can be mentioned oxygen-containing organic compounds of titanium, such as titanium tetrabutoxide, and halides of titanium, such as titanium tetrachloride. As the magnesium-containing reactant, there can be mentioned a reactant comprising magnesium and an alcohol such as ethanol or butanol or an organic silanol, and an oxygen-containing organic compound of magnesium, such as a magnesium alkoxide. As the organic aluminum compound, there can be mentioned diethylaluminum chloride, ethylaluminum dichloride, i-butylaluminum dichloride and tri-i-butylaluminum. As the silicon compound, there can be mentioned polysiloxanes such as dimethylpolysiloxane and methylhydropolysiloxane. As the organic metal catalyst containing a metal of the group Ia, IIa, IIb, IIIb or IVb of the Periodic Table, there can be mentioned triethylaluminum and tri-i-butylaluminum. Preferred embodiments of the process for preparing the above-mentioned solid catalyst are disclosed in Japanese Unexamined Patent Publication No. 62-135501 and Japanese Unexamined Patent Publication No. 60-262802.

It is indispensable that the catalyst satisfies the requirements of Kd>0.3 and Mw/Mn of from 7 to 17. Preferably Kd and Mw/Mn are independently determined by polymerization experiments.

In carrying out the present invention, the solid catalyst is preferably used in an amount of 0.001 to 25 millimoles as the titanium atom per liter of the solvent when the polymerization is carried out in the liquid phase, or per liter of the volume of one reactor when the polymerization is carried out in the vapor phase. The organic metal catalyst is preferably used at a concentration of 0.02 to 50 millimoles, especially 0.2 to 5 millimoles, per liter of the solvent.

Polymerization of ethylene or copolymerization of ethylene with an α-olefin is carried out in the liquid phase or gas phase in the presence or absence of an inert solvent. Where the polymerization is carried out in the liquid phase, slurry polymerization is preferred.

Any inert solvent customarily used in the liquid phase polymerization can be used in the present invention. Alkanes and cycloalkanes having 4 to 20 carbon atoms, such as isobutane, pentane, hexane, heptane and cyclohexane, are especially preferable.

Any temperature lower than the melting point of the polymer can be optionally selected as the polymerization temperature in the present invention, but temperatures in the range of from 30° to 100° C. are preferable. Especially, when the polymerization for production of the component U is carried out at the first stage, since the polymerization activity of this reaction is high, temperatures in the range of from 30° to 60° C. are preferable. Preferably the reaction pressure is in the range of from atmospheric pressure to 100 kg/cm$^2$G, especially from atmospheric pressure to 50 kg/cm$^2$G.

The ethylene polymer prepared according to the above-mentioned process is improved in the melt tension and die swell. However, the ethylene polymer can be further modified according to intended use of the product by contacting the powdery ethylene polymer with a radical generator. When a uniform quality is severely required in the modification, a process disclosed in Japanese Unexamined Patent Publication No. 59-68530 is preferably adopted as the modification process. According to this process, the starting ethylene polymer powder is swollen with a solvent, a liquid radical generator is incorporated into the swollen powder, the mixture is dried to obtain the ethylene polymer powder containing the radical generator homogeneously, and the radical generator-containing ethylene polymer powder is heat-treated at a temperature higher than the decomposition temperature of the radical generator. If this process is adopted, the radical generator adheres uniformly even to insides of fine ports of the ethylene polymer powder, and when the so-obtained modified ethylene polymer is shaped into a film, formation of gels or fish-eyes can be completely prevented.

When a uniform quality is not so severely required in the modification, the modification process is not particularly critical, and there can be adopted a process in which a so-called master batch formed by impregnating the polymer with a liquid radical generator is incorporated into the ethylene polymer to effect the contact and a process in which a stabilizer is impregnated with a radical generator in advance and incorporated into the ethylene polymer to effect the contact.

Organic peroxides such as hydroperoxides, dialkyl peroxides and peroxy esters are preferably used as the radical generator in the present invention, and those in which the decomposition temperature giving a half-value period of 1 minute is higher than 150° C. are especially preferred. As preferred examples, there can be mentioned dialkyl peroxides such as dicumyl peroxide, 2,5-dimethyl-2,5-di(t-butylperoxy)hexyne-3, 2,5-dimethyl-2,5-di)t-butylperoxy)hexane and d,d'-bis(t-butylperoxyisopropyl)benzene.

Preferably the amount of the radical generator added is 2 to 500 ppm based on the ethylene polymer. If the amount of the radical generator is smaller than 2 ppm, the effect of modifying the ethylene polymer is not prominent. If the amount of the radical generator exceeds 500 ppm, the modifying reaction is excessively advanced and the quality of the molded ethylene polymer product is degraded.

Where the ethylene polymer having the radical generator incorporated therein must be dried, it is possible that elevation of the temperature promotes decomposition of the radical generator and causes troubles such as agglomeration of the melt of the ethylene polymer. Therefore, preferably the drying operation is carried out at a temperature lower than 120° C.

Furthermore, the modification can be accomplished according to a process in which air or oxygen is used as the radical generator and a heat treatment is carried out in the state where the ethylene polymer is contacted with air or oxygen.

The heat treatment is sufficiently accomplished only by passing the ethylene polymer through an ordinary pelletizing extruder. It is sufficient if the heat treatment operation temperature is higher than the decomposition temperature of the radical generator contained in the ethylene polymer as the reaction mixture. For example, the operation temperature for an ordinary extruder, which is in the range of from about 150° to about 350° C., can be adopted.

According to the present invention, by the technique of preparing ethylene polymer comprising three components U, H and L by using at three polymerization reactors while utilizing a Ziegler type catalyst having a high activity and a large rate constant of deactivation, which is improved so that a polymer having a specific molecular weight distribution can be obtained, the following effects can be attained.

In the first place, the viscoelastic properties of a molten polymer are improved, and an ethylene polymer having a high adaptability to blow molding and extrusion molding can be prepared.

In the second place, when the above-mentioned ethylene polymer is prepared in a continuous manner, the homogeneousness of the obtained ethylene polymer is highly improved by determining the molecular weights and production ratios of the respective components based on the molecular weight $[\eta]_W$ of the finally prepared ethylene polymer, determining the α-olefin contents in the respective components based on the of the respective components and using a catalyst having the above-mentioned characteristics.

In the third place, the melt tension and die swell can be improved by modifying the obtained ethylene polymer powder with a radical generator according to intended use of the product.

In the fourth place, an ethylene polymer having a broad molecular weight distribution and having a good processability can be obtained.

The present invention will now be described in detail with reference to the following examples that by no means limit the scope of the invention.

In the following examples, referential examples and comparative examples, the properties of polymers were measured according to the following methods.

MI

The melt index was measured under conditions E of ASTM D-1238.

N VALUE

The ratio HLMI/MI of the high-load melt index (HLMI) determined under conditions F of ASTM D-1238 to MI mentioned above was calculated as the N value, one criterion indicating the molecular weight distribution. A larger N value shows a broader molecular weight distribution.

DENSITY

The true density was determined according to JIS K-6760.

MELT TENSION

By using a melt tension tester (supplied by Toyo Seiki), a polymer was extruded through an orifice of a nozzle having a diameter of 2.095 mm and a length of 8 mm at 190° C. at a dropping speed of 10 mm/min, and the tension on winding of an extruded monofilament was measured.

DIE SWELL

By using the above-mentioned tension tester and orifice, the die swell (Sr-I) was measured at 190° C. at a shearing rate of 14 sec$^{-1}$ and the die swell (SR-II) was measured at 190° C. at a shearing rate of 50 sec$^{-1}$.

DEPENDENCY (K) OF DIE SWELL ON SHEARING SPEED

The value K was calculated according to the following formula:

$$K = (SR-I - SR-II)/\log(50/15)$$

INTRINSIC VISCOSITY [η]

The intrinsic viscosity was measured in o-dichlorobenzene at 140° C. The relation represented by the following formula is established between the intrinsic viscosity [η] and the viscosity average molecular weight M:

$$[\eta] = 3.56 \times 10^{-4} M^{0.725}$$

RATE CONSTANT OF DEACTIVATION KD

The change of the ethylene consumption (Nl/hr) was plotted on the logarithmic scale of a semilogarithmic graph to obtain an approximate straight line, and the gradient obtained by calculation according to the method of least squares was designated as Kd.

MOLECULAR WEIGHT DISTRIBUTION Mw/Mn

Polymerization for formation ethylene polymer corresponding to the component H was simply carried out in an autoclave, and the obtained ethylene polymer was subjected to the gel permeation chromatography (GPC) to determine Mw/Mn. The polymerization was conducted at a temperature of 80° C. under an ethylene pressure, of 6 Kg/cm$^2$G and a hydrogen partial pressure of 1.5 kg/cm$^2$G.

REFERENTIAL EXAMPLE 1

(a) PREPARATIONOF SOLID CATALYST COMPONENT

A catalyst-preparing device equipped with a stirrer and having a capacity of 10 l was charged with 40 g (1.65 moles) of metallic magnesium powder and 28.3 g (0.083 mole) of titanium tetrabutoxide in a nitrogen atmosphere, and the temperature was elevated to 80° C. Then, a mixture of 140.4 g (1.89 mole) of n-butanol having 2.0 of iodine dissolved therein and 246.4 g (1.89 moles) of 2-ethylhexanol was dropped into the mixture over a period of 2 hours. Then, the mixture was heated at 120° C. to effect reaction. Then, 2,720 ml of hexane was added to the obtained reaction product at room temperature, and the mixture was stirred at 70° C. for 1 hour. Then, 907 ml of a hexane solution containing 30% by weight (1.65 moles) of diethylaluminum chloride was added to the resulting solution over a period of 2 hours at 45° C., and the mixture was stirred at 60° C. for 1 hour. Then, 198 g (1.65 gram-atoms as silicon) of methylhydropolysiloxane (the viscosity was about 30 cSt at 25° C.) was added to the mixture and reaction was carried out under reflux for 1 hour. Then, the reaction mixture was cooled to 45° C. and 3670 ml of a hexane solution containing 50% by weight of i-butylaluminum dichloride was added to the reaction mixture over a period of 2 hours. After completion of addition, the mixture was stirred for 70° C. for 1 hour. Hexane was added to the product and washing was carried out 15 times according to the decantation method, Thus, a slurry of the solid catalyst component suspended in hexane was obtained. A part of the slurry was sampled, the supernatant was removed, and the residue was dried in a nitrogen atmosphere. When the elementary analysis was carried out, it was found that the Ti content was 2.1% by weight.

(b) POLYMERIZATION OF ETHYLENE

The inner atmosphere of a stainless steel autoclave having an inner volume of 2 l and provided with an electromagnetic stirrer was completely replaced by nitrogen, the autoclave was charged with 1.2 l of hexane and the inner temperature was adjusted to 80° C. Then, 0.23 g (1.2 millimoles) of tri-i-butylaluminum as the catalyst component and the slurry containing 10 mg of the solid catalyst component, which was obtained in (a) above, were added in succession to the charge of the autoclave. The inner pressure of the autoclave was adjusted to 1 kg/cm$^2$G and hydrogen was introduced into the autoclave. Then, polymerization was conducted for 1.5 hours while continuously introducing ethylene into the autoclave so that the inner pressure of the autoclave was 8.5 kg/cm$^2$G. Hydrogen was introduced into the autoclave so that the ratio of the amount of hydrogen dissolved in hexane to the amount of ethylene dissolved in hexane was 0.03 g/g. After termination of the polymerization, the autoclave was cooled to expel the unreacted gas, and the ethylene polymer was taken out, separated from the solvent by filtration and dried.

Thus, 279 g of an ethylene polymer having a melt index of 0.04 g/10 min, HLMI/MI of 99 and a bulk density of 0.30 g/cm$^3$ was obtained. The amount of the ethylene polymer formed per gram of the solid catalyst component (A) (hereinafter referred to as "activity") was 27,900 g/g. The average particle diameter was 211 μm, and the proportion of fine particles having a particle diameter smaller than 105 μm was 5.7% by weight.

Furthermore, Mw/Mn was 8.0. When the time was plotted on the abscissa and the logarithm of the amount of reacted ethylene was plotted on the ordinate, the change of the conversion of ethylene with the lapse of time was shown by a line a in FIG. 1. The gradient of this line was determined as the rate of constant of deactivation according to the method of least squares. It was found that the rate constant of deactivation Kd was 0.62 hr$^{-1}$.

REFERENTIAL EXAMPLE 2

(a) PREPARATION OF SOLID CATALYST COMPONENT

A catalyst-preparing device equipped with a stirrer and having a capacity of 10 l was charged with 40 g (1.65 moles) of metallic magnesium powder and 224 g (0.66 mole) of titanium tetrabutoxide in a nitrogen atmosphere and the temperature was elevated to 80° C. Then, a mixture of 134 g (1.82 moles) of n-butanol having 2.0 g of iodine dissolved therein and 109 g (1.82 moles) of i-propanol was dropped into the mixture over a period of 2 hours. Then, the mixture was heated at 120° C. to effect reaction. Then, 2,720 ml of hexane was added to the obtained reaction product at room temperature, and the mixture was stirred at 70° C. for 1 hour. Then, 1,820 ml of a hexane solution containing 30% by weight (3.3 moles) of diethylaluminum chloride was added to the resulting solution over a period of 1 hour at 45° C., and the mixture was stirred at 70° C. for 1 hour. Then, the reaction mixture was cooled to 45° C. and 1,225 ml of a hexane solution containing 50% by weight of i-butylaluminum dichloride was added to the reaction mixture over a period of 1 hour. After completion of the addition, the mixture was stirred at 70° C. for 1 hour. Hexane was added to the product and washing was carried out 15 times according to the decantation method. Thus, a slurry of the solid catalyst component suspended in hexane was obtained. A part of the slurry was sampled, the supernatant was removed, and the residue was dried in a nitrogen atmosphere. When the elementary analysis was carried out, it was found that the Ti content was 10.8% by weight.

(b) POLYMERIZATION OF ETHYLENE

By using the solid catalyst component obtained in (a) above, polymerization of ethylene was carried out in the same manner as described in (b) of Referential Example 1.

As the result, 280 g of an ethylene polymer having a melt index of 0.09 g/10 min HLMI/MI of 57 and a bulk density of 0.33 g/cm$^3$ was obtained. The amount of the ethylene polymer produced per gram of the solid catalyst component was 28,000 g. The average particle size was 395 μm and the proportion of fine particles having a particle size smaller than 105 μm was 0.6% by weight. Furthermore, Mw/Mn was 5.5 and the rate constant of deactivation Kd was 0.23 hr$^{-1}$. The change of the conversion of ethylene with the lapse of time is shown by a line b in FIG. 1.

REFERENTIAL EXAMPLE 3

(a) PREPARATION OF SOLID CATALYST COMPONENT

A catalyst-preparing device equipped with a stirrer and having a capacity of 10 , 1 was charged with 40 g (1.65 moles) of metallic magnesium powder and 224 g (0.41 mole) of tetrakis(2-ethylhexyloxy)silane in a nitrogen atmosphere, and the temperature was elevated to 80° C. Then, a mixture of 141 g (1.90 moles) of n-butanol having 2.0 g of iodine dissolved therein and 247 g (1.90 moles) of 2-ethylhexanol was dropped into the mixture over a period of 2 hours. Then, the mixture was heated at 120° C. to effect reaction. Then 2,720 ml of decane was added to the obtained reaction product at room temperature, and the mixture was stirred at 70° C. for 1 hour. Then, 99 g (1.65 gram-atoms as silicon) of methylhydropolysiloxane having a viscosity of about 30 cSt at 25° C. was added to the mixture and reaction was carried out at 70° C. for 1 hour. Then, the reaction mixture was cooled to 30° C. and 2,145 ml of a hexane solution containing 50% by weight of i-butylaluminum dichloride was added to the reaction mixture over a period of 90 minutes. After completion of the addition, the mixture was stirred at 70° C. for 1 hour. Decane was added to the product and washing was carried out 5 times according to the decantation method. Then 2,000 ml of decane was added to the mixture and 157 g of titanium terachloride was added to the mixture at room temperature. Then, the temperature was elevated to 100° C. and the mixture was maintained at this temperature for 1 hour. The mixture was cooled to room temperature, and hexane was added to the product and washing was conducted 15 times according to the decantation method. Thus, a slurry of the solid catalyst component suspended in hexane was obtained. A part of the slurry was sampled and the supernatant was removed, and the residue was dried in a nitrogen atmosphere. When the elementary analysis was carried out, it was found that the Ti content was 5.0% by weight.

(b) POLYMERIZATION OF ETHYLENE

By using the solid catalyst component obtained in (a) above, polymerization of ethylene was carried out in the same manner as described in (b) of Referential Example 1.

As the result, 220 g of an ethylene polymer having a melt index of 0.05 g/10 min HLMI/MI of 93 and a bulk density of 0.33 g/cm$^3$ was obtained. The amount of the ethylene polymer produced per gram of the solid catalyst component was 22,000 g. The average particle size was 250 μm and the proportion of fine particles having a particle size smaller than 105 μm was 4.9% by weight. Furthermore, Mw/Mn was 8.3, and the rate constant of deactivation Kd was 0.12 hr$^{-1}$. The change of the conversion of ethylene with the lapse of time was shown by a line c in FIG. 1.

EXAMPLE 1

[THREE-STAGE POLYMERIZATION]

(POLYMERIZATION FOR PRODUCTION OF COMPONENT L)

Continuous polymerization was carried out by using three polymerization reactors connected in series. In a first polymerization reactor having an inner volume of 300 l, hexane, ethylene, hydrogen and the solid catalyst component obtained in Referential Example 1 were continuously supplied at rates of 150 kg/hr, 15.0 kg/hr, 480 Nl/hr and 0.8 g/hr, respectively. Furthermore, tri-isobutylaluminum and butene-1 were continuously supplied so that the concentration of tri-isobutylaluminum aluminum in the liquid was 1.0 millimole/kg of the hexane and the butene-1/ethylene weight ratio was 0.4 g/g. The polymerization temperature was adjusted to 85° C.

The polymer-containing slurry formed in the first polymerization reactor was continuously introduced into the second polymerization reactor through a flush tank and a pump.

(POLYMERIZATION FOR PRODUCTION OF COMPONENT H)

Into a second polymerization reactor having an inner volume of 300 l, hexane, ethylene and hydrogen were continuously introduced at rates of 27 kg/hr, 15.8 kg/hr and 90 Nl/hr, respectively, and butene-1 was continuously introduced at such a rate that the weight ratio of butene-1 in the liquid to ethylene was 0.5 g/g. The temperature was adjusted to 85° C.

The polymer-containing slurry formed in the second polymerization reactor was continuously supplied into a third polymerization reactor through a flush tank and a pump.

(POLYMERIZATION FOR PRODUCTION OF COMPONENT U)

Into a third polymerization reactor having an inner volume of 500 l, hexane and ethylene were continuously introduced at rates of 8 kg/hr and 9.0 kg/hr, respectively, and butene-1 was continuously introduced at such a rate that the weight ratio of butene-1 in the liquid to ethylene was 1.7 g/g. A minute amount of hydrogen was continuously supplied for adjusting the molecular weight. The temperature was adjusted to 50° C.

The polymer-containing slurry formed in the third polymerization reactor was separated into the polymer and hexane by a centrifugal separator, and the polymer was dried.

When small amounts of the polymers discharged from the respective polymerization reactors were sampled and examined, it was found that [η] of the polymer formed from the first polymerization reactor was 0.65, [η] of the polymer from the second polymerization reactor was 1.78, and [η] of the final product was 2.45. Furthermore, when the unreacted gases of the respective polymerization reactors were analyzed, it was found that the production ratios in the first, second and third polymerization vessels were 41%, 42% and 17%, respectively. From the foregoing results, it was seen that the intrinsic viscosities [η] of the components H and U were 2.88 and 5.7, respectively.

The α-olefin content of the polymer produced at the step for producing the component L was 0.3% by weight, and from the relation between the amount charged of butene-1 and the ethylene partial pressure, it was found that the α-olefin contents of the polymers produced at the steps for producing the components H and U were 0.4% by weight and 0.8% by weight, respectively.

(MODIFICATION OF ETHYLENE POLYMER)

An autoclave having an inner volume of 200 l was charged with 40 kg of the so-obtained ethylene polymer. Separately, a radical generator solution comprising 0.40 g (corresponding to 10 ppm) of α, α'-bis(t-butyl-peroxypropyl) benzene as the radical generator of 40 kg of hexane as the inert organic solvent was prepared.

All of the radical generator solution was poured into the autoclave while stirring the ethylene polymer powder int he autoclave, and the mixture was stirred in this state for 15 minutes. Then, the mixture was withdrawn from the autoclave and was then dried in a batchwise air-circulating drier at an inner temperature of 90° C. to obtain a reaction mixture.

Then, a stabilizer (Irganox B-220 supplied by Ciba-Geigy) was added in an amount of 700 ppm to the polyethylene powder, and granulation was carried out at a resin temperature of 200° C. by an extruder having a screw diameter of 65 mm to complete the modification. The modified ethylene polymer was characterized by MI of 0.028 g/10 min, an N value of 265, a density of 0.950 g/cm$^3$, a melt tension of 38.0 g, and a die swell SR-I of 1.71 and a die swell SR-II of 1.80. The dependency of the die swell on the shearing rate was 0.17.

The modified ethylene polymer was formed into an inflation film by using an extruder having a screw diameter of 25 mm. The number of fish-eyes larger than 0.3 mm was as small as 760 per 10 m$^2$, and it was confirmed that the modified ethylene polymer was a homogeneous polymer.

COMPARATIVE EXAMPLE 1

[TWO-STAGE POLYMERIZATION]

(POLYMERIZATION FOR PRODUCTION OF COMPONENT L)

Two-stage polymerization was carried out by using the same first and second polymerization reactors as used in Example 1. Into the first polymerization reactor, hexane, ethylene, hydrogen and the solid catalyst component prepared in Referential Example 1 were continuously supplied at rates of 150 kg/hr, 180 kg/hr, 460 Nl/hr and 0.8 g/hr, respectively Furthermore, tri-isobutylaluminum and butene-1 were continuously supplied so that the concentration of tri-isobutylaluminum in the liquid was 1.0 millimole/kg of hexane and the weight ratio of butene-1 to ethylene was 0.7 g/g.

The polymer-containing slurry formed in the first polymerization reactor was continuously introduced into the second polymerization reactor through a flush tank and a pump.

(POLYMERIZATION FOR PRODUCTION OF COMPONENT H)

Into the second polymerization reactor, hexane, ethylene and hydrogen were continuously introduced at rates of 27 kg/hr, 20.0 kg/hr and 25 Nl/hr, respectively, and butene-1 was continuously introduced at such a rate that the weight ratio of butene-1 in the liquid to ethylene was 0.7 g/g. The temperature was adjusted at 80° C.

The polymer-containing slurry formed in the second polymerization reactor was separated into the polymer and hexane by a centrifugal separator, and the polymer was dried.

When small amounts of the polymers discharged from the first and second polymerization reactors were sampled and examined, it was found that [η] of the polymer from the first polymerization reactor was 0.7 and [η] of the final product was 2.35. When the unreacted gases in the first and second polymerization reactors were analyzed, it was found that the production ratios in the first and second polymerization reactors were 50% and 50%, respectively. From the foregoing results, it was seen that [η] of the polymer produced in the second polymerization reactor was 4.0. In the same manner as described in Example 1, the obtained polymer was modified and granulated. The results are shown in Table 2.

EXAMPLES 2 THROUGH 7 AND COMPARATIVE EXAMPLES 2 THROUGH 8

By using the solid catalyst prepared in Referential Example 1, the three-stage polymerization was carried out in the same manner as described in Example 1 except that the polymerization conditions were changed as indicated in Table 1. More specifically, in Examples 8 through 10 and 12 and 13 and Comparative Example 6, the polymerization order was changed to the order of component U→component L→component H. The results of the measurement of the physical properties of the obtained ethylene polymers are shown in Table 2. In the examples where the modification with the radical generator was carried out, the amount of the radical generator is shown.

In Comparative Example 7, since solid catalyst obtained in Referential Example 2 was used, the number of fish-eyes was drastically increased. Furthermore, in Comparative Example 8, since the solid catalyst obtained in Referential Example 3 was used, the number of fisheyes was drastically increased.

TABLE 1

| | Example | | | | | | | |
|---|---|---|---|---|---|---|---|---|
| | 1 | 2 | 3 | 4 | 5 | 6 | 7 | 8 |
| First polymerization reactor | | | | | | | | |
| Temperature (°C.) | 85 | 85 | 85 | 85 | 80 | 85 | 85 | 50 |
| Ethylene (kg/Hr) | 15.0 | 15.0 | 13.1 | 14.7 | 17.1 | 14.7 | 17.1 | 7 |
| Hydrogen (Nl/Hr) | 480 | 400 | 400 | 400 | 380 | 550 | 400 | 6 |
| Kind of α-olefin | Butene-1 | Butene-1 | Butene-1 | None | None | None | None | Butene-1 |
| α-olefin/ethylene (g/g) | 0.4 | 0.2 | 0.05 | 0 | 0 | 0 | 0 | 3.5 |
| Second polymerization reactor | | | | | | | | |
| Temperature (°C.) | 85 | 85 | 85 | 85 | 80 | 85 | 85 | 85 |
| Ethylene (kg/Hr) | 15.8 | 15.0 | 17.8 | 22.7 | 17.8 | 17.8 | 17.8 | 10 |
| Hydrogen (Nl/Hr) | 90 | 80 | 70 | 70 | 100 | 80 | 100 | 450 |
| Kind of α-olefin | Butene-1 | Butene-1 | Butene-1 | Butene-1 | Butene-1 | Butene-1 | Butene-1 | Butene-1 |
| α-olefin/ethylene (g/g) | 0.5 | 0.6 | 0.2 | 0.4 | 0.2 | 0.25 | 0.2 | 0.2 |
| Third polymerization reactor | | | | | | | | |
| Temperature (°C.) | 50 | 50 | 50 | 50 | 50 | 50 | 50 | 85 |
| Ethylene (kg/Hr) | 9.0 | 10.3 | 9.6 | 6 | 9.6 | 8.4 | 10.6 | 16 |

TABLE 1-continued

| | | | | | | | | |
|---|---|---|---|---|---|---|---|---|
| Hydrogen (Nl/Hr) | 20 | 35 | 8 | 3 | 10 | 1 | 10 | 300 |
| Kind of α-olefin | Butene-1 | Butene-1 | Butene-1 | Butene-1 | Butene-1 | Butene-1 | Butene-1 | Butene-1 |
| α-olefin/ethylene (g/g) | 1.7 | 0.8 | 2.0 | 3.0 | 2.0 | 2.5 | 1.8 | 0.4 |
| Results of polymerization | | | | | | | | |
| Proportion (weight %) | | | | | | | | |
| Component L | 41 | 39 | 41 | 35 | 41 | 37 | 41 | 34 |
| Component H | 42 | 40 | 42 | 52.5 | 41.5 | 45 | 42.5 | 43 |
| Component U | 17 | 21 | 17 | 12.5 | 17.5 | 18 | 16.5 | 23 |
| Intrinsic viscosity [η] | | | | | | | | |
| Component L | 0.65 | 0.65 | 0.7 | 0.6 | 0.75 | 0.6 | 0.7 | 0.4 |
| Component H | 2.88 | 2.2 | 2.72 | 2.7 | 2.72 | 2.8 | 2.7 | 2.75 |
| Component U | 5.7 | 7.2 | 7.2 | 7.2 | 6.7 | 7.3 | 8.7 | 5.3 |
| Final polymer | 2.45 | 2.65 | 2.66 | 2.53 | 2.62 | 2.79 | 2.89 | 2.52 |
| Content of α-olefin (weight %) | | | | | | | | |
| Component L | 0.3 | 0.1 | 0.02 | 0 | 0 | 0 | 0 | 0.1 |
| Component H | 0.4 | 0.4 | 0.1 | 0.3 | 0.1 | 0.1 | 0.1 | 0.2 |
| Component U | 0.8 | 0.4 | 1.0 | 1.5 | 1.0 | 1.2 | 0.9 | 3.8 |

| | Example | | | | | | | | |
|---|---|---|---|---|---|---|---|---|---|
| | 9 | 10 | 11 | 12 | 13 | 14 | 15 | 16 | 17 |
| First polymerization reactor | | | | | | | | | |
| Temperature (°C.) | 45 | 45 | 85 | 50 | 45 | 85 | 85 | 85 | 85 |
| Ethylene (kg/Hr) | 7.3 | 5.7 | 15.6 | 5.5 | 5.0 | 15.8 | 15.8 | 15.8 | 13.5 |
| Hydrogen (Nl/Hr) | 10 | 8 | 500 | 15 | 7 | 170 | 180 | 180 | 370 |
| Kind of α-olen | Butene-1 | Butene-1 | Butene-1 | None | Butene-1 | None | None | None | Butene-1 |
| α-olefin/ethylene (g/g) | 2.5 | 1.0 | 0.2 | 0.7 | 1.0 | 0 | 0 | 0 | 0.17 |
| Second polymerization reactor | | | | | | | | | |
| Temperature (°C.) | 85 | 85 | 85 | 85 | 85 | 82 | 82 | 82 | 82 |
| Ethylene (kg/Hr) | 15.1 | 13.9 | 15.2 | 8.5 | 12.3 | 17.6 | 17.6 | 17.6 | 15.7 |
| Hydrogen (Nl/Hr) | 530 | 800 | 100 | 550 | 400 | 85 | 90 | 90 | 65 |
| Kind of α-olefin | Butene-1 | Butene-1 | Butene-1 | Butene-1 | Butene-1 | None | None | None | Butene-1 |
| α-olefin/ethylene (g/g) | 0.5 | 0.2 | 0.2 | 0.2 | 0.3 | 0 | 0 | 0 | 0.4 |
| Third polymerization reactor | | | | | | | | | |
| Temperature (°C.) | 85 | 85 | 50 | 85 | 85 | 50 | 50 | 50 | 50 |
| Ethylene (kg/Hr) | 22 | 16.4 | 5.4 | 14.5 | 16.4 | 11.5 | 11.5 | 11.5 | 11.2 |
| Hydrogen (Nl/Hr) | 350 | 500 | 60 | 550 | 350 | 10 | 10 | 8 | 2.3 |
| Kind of α-olefin | Butene-1 | Butene-1 | Butene-1 | None | Butene-1 | Butene-1 | Butene-i | Butene-1 | Butene-1 |
| α-olefin/ethylene (g/g) | 0.15 | 0.3 | 0.8 | 0 | 0.8 | 0.5 | 0.2 | 0.3 | 1.5 |
| Results of polymerization | | | | | | | | | |
| Proportion (weight %) | | | | | | | | | |
| Component L | 38 | 43 | 47 | 28 | 40.3 | 38.8 | 39 | 39 | 41.2 |
| Component H | 45.5 | 41.5 | 44.8 | 56 | 42.2 | 44 | 44 | 44 | 42 |
| Component U | 16.5 | 15.5 | 8.2 | 16 | 17.5 | 17.2 | 17 | 17 | 16.8 |
| Intrinsic viscosity [η] | | | | | | | | | |
| Component L | 0.6 | 0.5 | 0.6 | 0.6 | 0.55 | 1.4 | 1.4 | 1.4 | 0.77 |
| Component H | 1.9 | 2.8 | 1.85 | 2.15 | 2.15 | 3.0 | 3 | 3 | 3.3 |
| Component U | 7.9 | 11 | 7.3 | 5.8 | 12.0 | 7.6 | 9.1 | 10.3 | 5.7 |
| Final Polymer | 2.57 | 3.05 | 1.71 | 2.30 | 3.22 | 3.15 | 3.41 | 3.61 | 2.66 |
| Conent of α-olefin (weight %) | | | | | | | | | |
| Component L | 0.4 | 0.1 | 0.1 | 0.1 | 0.1 | 0 | 0 | 0 | 0.1 |
| Component H | 0.1 | 0.1 | 0.1 | 0 | 0.5 | 0 | 0 | 0 | 0.2 |
| Component U | 3.2 | 0.8 | 0.4 | 1.2 | 0.8 | 0.3 | 0.1 | 0.1 | 0.8 |

| | Comparative Example | | | | | | | |
|---|---|---|---|---|---|---|---|---|
| | 1 | 2 | 3 | 4 | 5 | 6 | 7 | 8 |
| First polymerization reactor | | | | | | | | |
| Temperature (°C.) | 85 | 85 | 80 | 85 | 85 | 50 | 80 | 85 |
| Ethylene (kg/Hr) | 18.0 | 13 | 13.7 | 12.5 | 13.2 | 6.3 | 13 | 15 |
| Hydrogen (Nl/Hr) | 460 | 400 | 400 | 620 | 700 | 20 | 400 | 400 |
| Kind of α-olefin | Butene-1 | Butene-1 | Butene-1 | Butene-1 | None | Butene-1 | None | Butene-1 |
| α-olefin/ethylene (g/g) | 0.7 | 0.05 | 0.42 | 0.04 | 0 | 0.2 | 0 | 0.2 |
| Second polymerization reactor | | | | | | | | |
| Temperature (°C.) | 80 | 80 | 80 | 85 | 85 | 85 | 85 | 85 |
| Ethylene (kg/Hr) | 20 | 20 | 15.9 | 18.0 | 12.5 | 9.8 | 15.3 | 15 |
| Hydrogen (Nl/Hr) | 25 | 80 | 110 | 80 | 160 | 380 | 100 | 80 |
| Kind of α-olefin | Butene-1 | Butene-1 | Butene-1 | Butene-1 | Butene-1 | Buetene-1 | Butene-1 | Butene-1 |
| α-olefin/ethylene (g/g) | 0.7 | 0.3 | 0.28 | 0.24 | 0.23 | 0.25 | 0.5 | 0.6 |
| Third polymerization reactor | | | | | | | | |
| Temperature (°C.) | | 65 | 65 | 65 | 60 | 85 | 65 | 50 |
| Ethylene (kg/Hr) | | 5.5 | 12.9 | 7.5 | 10.8 | 17.5 | 14 | 10.5 |
| Hydrogen (Nl/Hr) | | 2 | 1 | 8 | 80 | 450 | 10 | 30 |
| kind of α-olefin | | Butene-1 | Butene-1 | Butene-1 | Butene-1 | Butene-1 | Butene-1 | Butene-1 |
| α-olefin/ethylene (g/g) | | 3.0 | 3.3 | 2.6 | 0.1 | 0.8 | 1.5 | 1.2 |
| Results of polymerization | | | | | | | | |
| Proportion (weight %) | | | | | | | | |
| Component L | 50.0 | 35.2 | 32.6 | 33.5 | 40 | 34 | 38 | 39 |
| Component H | 50.0 | 55.0 | 34.5 | 49.0 | 38 | 43 | 37 | 40 |
| Component U | | 9.8 | 32 | 17.5 | 22 | 23 | 25 | 21 |

TABLE 1-continued

| Intrinsic viscosity [η] | | | | | | | | |
|---|---|---|---|---|---|---|---|---|
| Component L | 0.7 | 0.6 | 0.6 | 0.6 | 0.5 | 0.6 | 0.6 | 0.65 |
| Component H | 4.0 | 2.8 | 1.8 | 2.8 | 1.34 | 2.2 | 2.2 | 2.2 |
| Component U | | 6.6 | 6.1 | 4.7 | 5.9 | 5.7 | 6.5 | 7.0 |
| Final polymer | 2.35 | 2.40 | 2.78 | 2.43 | 2.01 | 2.46 | 2.67 | 2.60 |
| Content of α-olefin (weight %) | | | | | | | | |
| Component L | 0.4 | 0.02 | 0.3 | 0.02 | 0 | 0.1 | 0 | 0.1 |
| Component H | 0.4 | 0.1 | 0.1 | 0.1 | 0.1 | 0.4 | 0.4 | 0.4 |
| Component U | | 1.5 | 1.6 | 1.3 | 0.1 | 0.1 | 0.7 | 0.6 |

TABLE 2

| | Radical generator (ppm) | MI (g/10) | N value | Melt tension (g) | Die swell SR-I | Die swell K | Density (g/cm³) | Fish eye (/10 m²) |
|---|---|---|---|---|---|---|---|---|
| Example | | | | | | | | |
| 1 | 15 | 0.28 | 265 | 38.0 | 1.71 | 0.17 | 0.950 | 760 |
| 2 | 10 | 0.15 | 365 | 44.0 | 1.84 | 0.16 | 0.951 | 1350 |
| 3 | 0 | 0.033 | 198 | 36.5 | 1.64 | 0.26 | 0.950 | 860 |
| 4 | 0 | 0.037 | 174 | 29.5 | 1.58 | 0.27 | 0.951 | 750 |
| 5 | 10 | 0.017 | 267 | 40.5 | 1.77 | 0.21 | 0.951 | 1330 |
| 6 | 0 | 0.022 | 250 | 39.0 | 1.63 | 0.24 | 0.951 | 830 |
| 7 | 0 | 0.031 | 187 | 38.5 | 1.63 | 0.28 | 0.951 | 880 |
| 8 | 20 | 0.016 | 247 | 37.0 | 1.58 | 0.16 | 0.945 | 300 |
| 9 | 0 | 0.010 | 482 | 33.0 | 1.44 | 0.21 | 0.948 | 250 |
| 10 | 0 | 0.23 | 313 | 34.0 | 1.47 | 0.29 | 0.950 | 370 |
| 11 | 20 | 0.39 | 133 | 13.5 | 1.87 | 0.31 | 0.958 | 1130 |
| 12 | 25 | 0.013 | 351 | 32.0 | 1.56 | 0.18 | 0.951 | 780 |
| 13 | 0 | 0.012 | 408 | 39.5 | 1.65 | 0.29 | 0.945 | 1130 |
| 14 | 0 | 0.013 | 174 | 41.0 | 1.62 | 0.15 | 0.952 | 1680 |
| 15 | 0 | 0.009 | 227 | 44.0 | 1.64 | 0.23 | 0.952 | 1910 |
| 16 | 0 | 0.007 | 356 | 45.0 | 1.66 | 0.26 | 0.952 | 2060 |
| 17 | 10 | 0.016 | 284 | 37.5 | 1.71 | 0.24 | 0.949 | 810 |
| Comparative Example | | | | | | | | |
| 1 | 30 | 0.020 | 272 | 22.5 | 1.52 | 0.17 | 0.949 | 570 |
| 2 | 10 | 0.032 | 198 | 29.0 | 1.47 | 0.22 | 0.948 | 660 |
| 3 | 0 | 0.039 | 159 | 23.5 | 1.58 | 0.27 | 0.951 | 630 |
| 4 | 20 | 0.023 | 251 | 25.5 | 1.52 | 0.27 | 0.949 | 730 |
| 5 | 10 | 0.13 | 210 | 13.5 | 1.84 | 0.36 | 0.952 | 7600 |
| 6 | 0 | 0.019 | 307 | 25.0 | 1.44 | 0.18 | 0.949 | 15800 |
| 7 | 0 | 0.018 | 222 | 23.0 | 1.44 | 0.20 | 0.951 | 21000 |
| 8 | 0 | 0.022 | 248 | 23.5 | 1.45 | 0.20 | 0.950 | 19300 |

We claim:

1. A process for the preparation of an ethylene polymer, which comprises polymerizing ethylene, optionally with a small amount of an α-olefin, in the presence of a Ziegler catalyst in multiple stages, wherein by using a polymerization apparatus including at least three polymerization reactors, the following three ethylene polymer components U, H and L are prepared sequentially in an optional order;

an ethylene polymer component U having an α-olefin content $\alpha_u$, of 0.1 to 10% by weight and an intrinsic viscosity $[\eta]_u$ satisfying the requirement of $2 \times [\eta]_w \leq [\eta]_u \leq 5 \times [\eta]_w$ in which $[\eta]_w$ stands for the intrinsic viscosity of the entire ethylene polymer, the ratio $R_u$ of the component U in the entire ethylene polymer satisfying the requirement of $0.35 \times [\eta]_w \leq [\eta]_u \times R_u \leq 0.7 \times [\eta]_w$;

an ethylene polymer component H having an α-olefin content $\alpha_H$ of up to 20% by weight and an intrinsic viscosity $[\eta]_H$ satisfying the requirement of $[\eta]_w)^{\frac{1}{2}} \leq [\eta]_H \leq 1.5 \times [\eta]_w$, the ratio $R_H$ of the component H in the entire ethylene polymer satisfying the requirement of $0.25 \times [\eta]_w \leq [\eta]_H \times R_H \leq 0.7 \leq [\eta]_w$; and an ethylene polymer component L having an α-olefin content $\alpha_L$ of up to 10% by weight and an intrinsic viscosity $[\eta]_L$ satisfying the requirement of $0.2 \leq [\eta]_L \leq 2.0$, the ratio $R_L$ of the component L in the entire ethylene polymer satisfying the requirement of $[\eta]_L \times R_L \geq 0.05 \times [\eta]_w$;

the three components $R_U$, $R_H$ and $R_L$ in said ethylene polymer satisfying the requirement of $(R_U + R_H + R_L) = 1$ and each of $R_U$, $R_H$ and $R_L$ being smaller than 1, said ethylene polymer satisfying the requirement of $\alpha_U \times R_U \geq 0.2 \times (\alpha_U \times R_U + \alpha_H \times R_H + \alpha_L \times R_L)$, and wherein the catalyst has a property such that when the component H is prepared independently, the molecular weight distribution Mw/Mn of the obtained ethylene polymer is in the range of from 7 to 17 and the rate constant of deactivation Kd at said polymerization is larger than 0.3 hr$^{+1}$, and the intrinsic viscosity $[\eta]_W$ of the entire ethylene polymer is in the range of $1.5 \leq [\eta]_W \leq 4.0$.

2. The process according to claim 1, which further comprises the step of placing the resulting ethylene polymer in contact with a radical generator.

3. The process according to claim 2, wherein the ethylene polymer is placed in contact with the radical generator by a method in which the ethylene polymer in a powdery form or a state of swollen with a solvent is impregnated with a liquid radical generator, and then heated.

4. The process according to claim 3, wherein the radical generator is an organic peroxide such that the decomposition temperature giving a half-value period of one minute is at least 150° C., and the amount of the radical generator is 2 to 500 ppm based on the ethylene polymer.

5. The process according to claim 2, wherein the ethylene polymer is placed in contact with air or oxygen as the radical initiator and then heated.

6. The process according to claim 1, wherein the ethylene polymer component U has an intrinsic viscosity $[\eta]_U$ satisfying the requirement of $2.5 \times [\eta]_W \leq [\eta]_U \leq 4 \times [\eta]_W$ and the ratio $R_U$ of the ethylene polymer component in the entire ethylene polymer satisfying the requirement of $0.35 \times [\eta]_W \leq [\eta]_U \times R_U \leq 0.7 \times [\Theta]_W$; and the ethylene polymer component H has an intrinsic viscosity $[\eta]_H$ satisfying the requirement of $([\eta]_W)^{\frac{1}{2}} \leq [\eta]_H \leq 1.3 \times [\eta]_W$ and the ratio $R_H$ of the ethylene polymer component in the entire ethylene polymer satisfying the requirement of $0.3 \times [\eta]_W \leq [\eta]_H \times R_H \leq 0.6 \times [\eta]_W$.

7. The process according to claim 1, wherein the α-olefin is selected from the group consisting of propylene, butene-1, hexene-1, octene-1 and 4-methylpentene-1, and the αolefin contents $\alpha_U$, $\alpha_H$ and $\alpha_L$ in the respective components U, H and L satisfying the requirement of $\alpha_U \times R_U \geq 0.3 \times (\alpha_U \times R_U + \alpha_H \times R_H + \alpha_L \times R_L)$.

8. The process according to claim 1, wherein the rate constant of deactivation Kd at said polymerization is larger than $0.4 \text{ hr}^{+1}$.

9. The process according to claim 1, wherein the Ziegler catalyst comprises (A) a solid catalyst obtained by reacting (I) a reaction product between a transition metal-containing reactant containing at least one titanium compound and at least one member selected from the group consisting of (a) combination of metallic magnesium with hydroxyl group-containing organic compounds, and (b) oxygen-containing organic compounds of magnesium, (II) at least one organic aluminum compound represented by the general formula $AlR_nX_{3-n}$ in which R stands for an alkyl group having 1 to 20 carbon atoms, X stands for a halogen atom and n is a number of $0 \leq n \leq 3$ and (III) at least one silicon compound, and (B) an organic metal catalyst containing a metal of the group Ia, IIa, IIb, IIIb or IVb of the Periodic Table.

10. The process according to claim 1, wherein the polymerization of ethylene is carried the liquid phase or gas phase in the presence or absence of an inert solvent selected from the group consisting of alkanes and cycloalkanes, having 4 to 20 carbon atoms.

* * * * *